United States Patent
Ma et al.

(10) Patent No.: US 10,958,602 B2
(45) Date of Patent: Mar. 23, 2021

(54) METHOD AND DEVICE FOR PROCESSING INFORMATION BASED ON INSTANT MESSAGING

(71) Applicant: Alibaba Group Holding Limited, George Town (KY)

(72) Inventors: Xinglin Ma, Hangzhou (CN); Yida Zhao, Hangzhou (CN); Wang Liao, Hangzhou (CN)

(73) Assignee: Alibaba Group Holding Limited

( * ) Notice: Subject to any disclaimer, the term of this patent is extended or adjusted under 35 U.S.C. 154(b) by 89 days.

(21) Appl. No.: 15/769,055

(22) PCT Filed: Oct. 14, 2016

(86) PCT No.: PCT/CN2016/102095
§ 371 (c)(1),
(2) Date: Apr. 17, 2018

(87) PCT Pub. No.: WO2017/067419
PCT Pub. Date: Apr. 27, 2017

(65) Prior Publication Data
US 2018/0302353 A1    Oct. 18, 2018

(30) Foreign Application Priority Data
Oct. 23, 2015    (CN) .......................... 201510695892.6

(51) Int. Cl.
*G06F 15/16*    (2006.01)
*H04L 12/58*    (2006.01)
(Continued)

(52) U.S. Cl.
CPC ............ *H04L 51/043* (2013.01); *G06F 21/31* (2013.01); *G06F 21/604* (2013.01); *H04L 51/04* (2013.01); *H04L 51/32* (2013.01); *H04L 67/306* (2013.01)

(58) Field of Classification Search
CPC ....... H04L 51/043; H04L 51/04; H04L 51/32; H04L 67/306; H04L 67/1044;
(Continued)

(56) References Cited

U.S. PATENT DOCUMENTS 7,072,940 B1 *  7/2006  Day ...................... G06Q 10/10
                                                            707/999.01
7,577,711 B2    8/2009  McArdle
(Continued)

FOREIGN PATENT DOCUMENTS

CN    102075456    5/2011
CN    103051517    4/2013
(Continued)

*Primary Examiner* — Kevin T Bates
*Assistant Examiner* — Golam Mahmud
(74) *Attorney, Agent, or Firm* — Van Pelt, Yi & James LLP

(57) ABSTRACT

The present application provides an instant messaging-based method and means for processing information. The method comprises: receiving a group add request, said group add request being for requesting the addition of a first user to a first group; assessing whether the first user needs to be added to the first group with a specific status; if the assessment result is yes, then subjecting the group information of the first group to screening in accordance with the group permissions corresponding to the specific status in order to obtain screened group information and issuing the screened group information to the instant messaging client of the first user. The present application can solve information security problems while meeting instant messaging needs.

20 Claims, 6 Drawing Sheets

(51) Int. Cl.
*H04M 3/42* (2006.01)
*H04M 7/00* (2006.01)
*H04L 29/08* (2006.01)
*G06F 21/31* (2013.01)
*G06F 21/60* (2013.01)

(58) Field of Classification Search
CPC ............ H04L 63/0876; H04L 63/0815; H04L 51/046; G06F 21/604; G06F 21/31
USPC .......................................................... 709/206
See application file for complete search history.

(56) References Cited

U.S. PATENT DOCUMENTS

| | | | | |
|---|---|---|---|---|
| 8,027,335 | B2 * | 9/2011 | Ansari | H04L 12/2803 370/353 |
| 8,799,785 | B2 * | 8/2014 | Galvin, Jr. | H04L 67/306 715/747 |
| 8,818,276 | B2 * | 8/2014 | Kiukkonen | H04W 12/003 455/41.2 |
| 9,667,687 | B2 * | 5/2017 | Lv | H04L 67/02 |
| 2002/0194045 | A1 * | 12/2002 | Shay | G06Q 10/06 705/7.14 |
| 2004/0143633 | A1 | 7/2004 | McCarty | |
| 2005/0223075 | A1 | 10/2005 | Swearingen | |
| 2005/0228680 | A1 * | 10/2005 | Malik | G06Q 30/00 709/206 |
| 2006/0004911 | A1 * | 1/2006 | Becker | G06Q 10/107 709/207 |
| 2006/0182084 | A1 | 8/2006 | Ionescu | |
| 2007/0050341 | A1 * | 3/2007 | Hull | G06F 16/41 |
| 2007/0067443 | A1 * | 3/2007 | Seligmann | H04L 67/24 709/224 |
| 2007/0130260 | A1 * | 6/2007 | Weintraub | H04L 67/24 709/204 |
| 2007/0173284 | A1 * | 7/2007 | Chie | H04M 3/42365 455/552.1 |
| 2008/0109741 | A1 * | 5/2008 | Messing | G06Q 10/10 715/764 |
| 2008/0155030 | A1 * | 6/2008 | Fortier | H04L 51/04 709/206 |
| 2009/0006613 | A1 * | 1/2009 | Toutain | H04L 67/24 709/224 |
| 2009/0210358 | A1 * | 8/2009 | Chang | G06Q 99/00 705/500 |
| 2009/0234876 | A1 * | 9/2009 | Schigel | H04L 51/02 |
| 2010/0030643 | A1 * | 2/2010 | Sion | G06Q 30/0251 705/14.49 |
| 2010/0153453 | A1 * | 6/2010 | Knowles | G06Q 10/107 707/784 |
| 2012/0290950 | A1 * | 11/2012 | Rapaport | H04N 21/8358 715/753 |
| 2012/0297305 | A1 * | 11/2012 | Hehmeyer | H04L 67/14 715/733 |
| 2012/0316962 | A1 * | 12/2012 | Rathod | G06Q 10/107 705/14.54 |
| 2013/0217350 | A1 * | 8/2013 | Singh | G06Q 10/107 455/130 |
| 2013/0246514 | A1 | 9/2013 | Zhang | |
| 2014/0123025 | A1 * | 5/2014 | Bau | H04L 51/04 715/752 |
| 2015/0039700 | A1 * | 2/2015 | West | H04L 51/04 709/206 |
| 2015/0074557 | A1 * | 3/2015 | Reinhardt | G06F 16/9535 715/753 |
| 2015/0100503 | A1 * | 4/2015 | Lobo | G06Q 10/103 705/301 |
| 2015/0373192 | A1 * | 12/2015 | Chau | H04M 3/42365 370/259 |

FOREIGN PATENT DOCUMENTS

| | | | | |
|---|---|---|---|---|
| CN | 105610681 | | 5/2016 | |
| GB | 2511983 | A * | 9/2014 | ............ H04L 51/28 |

* cited by examiner

Editing Department

Name of department

Higher-level department

Set supervisor

Visitor mode  | Active |

All members of this department will have visitor mode. They can neither see nor contact anyone within the enterprise.

Save

FIG. 2

METHOD AND DEVICE FOR PROCESSING INFORMATION BASED ON INSTANT MESSAGING

CROSS REFERENCE TO OTHER APPLICATIONS

This application claims priority to International (PCT) Application No. PCT/CN16/102095 entitled METHOD AND DEVICE FOR PROCESSING INFORMATION BASED ON INSTANT MESSAGING, filed Oct. 14, 2016 which is incorporated herein by reference for all purposes, which claims priority to China Application No. 201510695892.6 entitled AN INSTANT MESSAGING-BASED INFORMATION-PROCESSING METHOD AND MEANS, filed Oct. 23, 2015 which is incorporated herein by reference for all purposes.

FIELD OF THE INVENTION

The present application relates to a field of communications technology. In particular, it relates to an instant messaging-based method and means for processing information.

BACKGROUND OF THE INVENTION

Instant messaging is a form of communication that is quite popular now on the Internet. Various kinds of new instant messaging software keep appearing all the time, and service providers are providing an ever-wider range of communication service functions.

In the prior art, if User A wishes to conduct instant messaging with User B, he or she will have to add User B as a friend. User B then will appear in the contact directory of User A's instant messaging software. By the same token, User A will appear in the contact directory of User B's instant messaging software. User A and User B may thereupon conduct instant messaging.

However, in actual applications there exist some special application scenarios: User A needs to conduct instant messaging with User B, but in order to prevent information leaks, doesn't want User B to see information relating to User A. Such a situation regularly occurs within an enterprise. For example, some enterprises will have temporary employees or contractors. Temporary employees or contractors need to be notified of some messages internal to the enterprise. It thus becomes necessary to add the temporary employees or contractors to the enterprise group. However, with existing instant messaging software, employees in an enterprise group may see some mutually registered personal information, as well as information about the enterprise's organizational structure, posing an information security risk. This instant messaging software problem urgently requires a solution.

SUMMARY OF THE INVENTION

Multiple aspects of the present application provide an instant messaging-based method and means for processing information, which are for solving information security problems while meeting instant messaging needs.

One aspect of the present application provides an instant messaging-based information-processing method, comprising:

receiving a group add request, said group add request being for requesting the addition of a first user to a first group;

assessing whether said first user needs to be added to said first group with a specific status;

if the assessment result is yes, then subjecting the group information of said first group to screening in accordance with the group permissions corresponding to said specific status in order to obtain screened group information and issuing said screened group information to the instant messaging client of said first user.

Another aspect of the present application provides an instant messaging-based information-processing means, comprising:

a receiving module, for receiving a group add request, said group add request being for requesting the addition of a first user to a first group;

an assessing module, for assessing whether said first user needs to be added with a specific status to said first group;

a processing module, for, when the assessment result of said assessing module is yes, subjecting the group information of said first group to screening in accordance with the group permissions corresponding to said specific status in order to obtain screened group information and issuing said screened group information to the instant messaging client of said first user.

In the present application, when a request to add first users to a first user group is received, an assessment is made as to whether the first users need to be added with a specific status to the first group. If the assessment result is yes, then the group information of the first group undergoes screening in accordance with the group permissions corresponding to the specific status, and the said screened group information is issued to the instant messaging clients of the first users. The addition of the first users with a specific status to the first group satisfies the instant messaging needs between the other users and the first users, and since the group information of the first users is screened, information that would not be appropriate for viewing by a user with a specific status can be screened out. In this way, the goal of information security is achieved.

BRIEF DESCRIPTION OF THE DRAWINGS

Various embodiments of the invention are disclosed in the following detailed description and the accompanying drawings.

In order to provide a clearer explanation of the technical schemes in embodiments of the present application, simple introductions are given below for the drawings, which are needed to describe the embodiments or the prior art. Obviously, the drawings described below are embodiments in the present application. Persons with ordinary skill in the art could, without expending creative effort, obtain other drawings on the basis of these drawings.

FIG. 2 is an illustration of an interface for configuring visitor status between groups, as provided by an embodiment of the present application.

DETAILED DESCRIPTION

Figure 1:
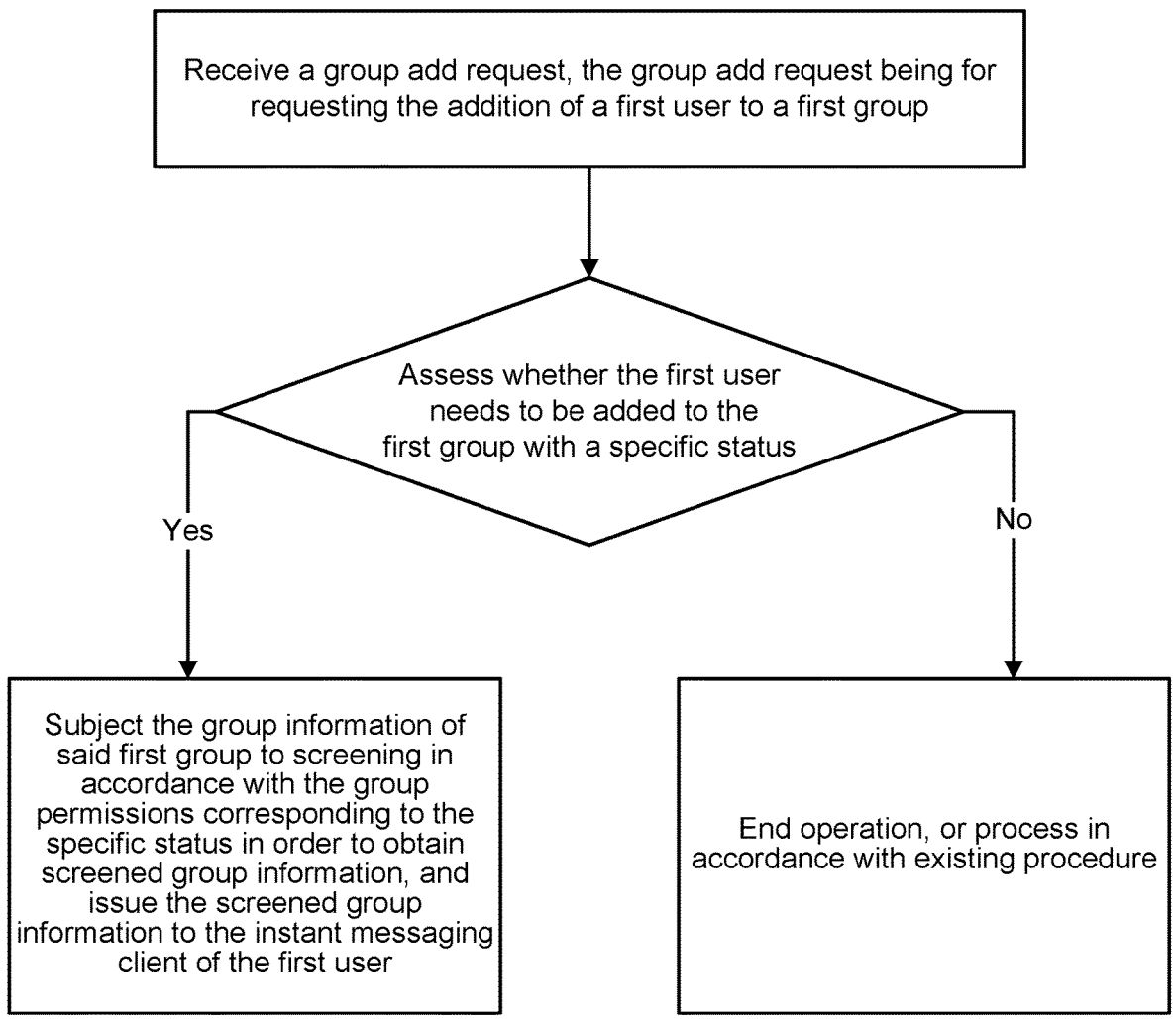
FIG. 1 is a flowchart of an instant messaging-based information-processing method provided by an embodiment of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to shed more light on the objectives, technical schemes, and advantages of the embodiments of the present application, the technical schemes in the embodiments of the present application are described clearly and completely in light of the drawings of the embodiments of the present application. Obviously, the embodiments described are some of the embodiments of the present application and are not all the embodiments. So long as no additional creative effort is expended, all other embodiments that are obtained by persons with ordinary skill in the art on the basis of embodiments in the present application fall within the scope of protection of the present application.

To address the problems of existing instant messaging apps, the present application provides a technical scheme, whose main principles are: In order to prevent information security risks relating to users who have an instant messaging need, a specific status is set, whereby users of this class are added with a specific status to a group. In this way, the need of other users within the group for instant messaging with this class of user is satisfied. In addition, group permissions corresponding to the specific status are configured to prohibit this class of user from viewing group information beyond the group permissions. The goal of information security is thereby achieved.

FIG. 1 is a flowchart of an instant messaging-based information-processing method provided by an embodiment of the present application. As shown in FIG. 1, the method comprises:

101: Receive a group add request. The group add request is for requesting the addition of a first user to a first group.

102: Assess whether the first user needs to be added with a specific status to the first user group. If the assessment result is yes, then execute step 103. If the assessment result is no, then execute step 104.

103: Subject the group information of said first group to screening in accordance with the group permissions corresponding to the specific status in order to obtain screened group information, and issue the screened group information to the instant messaging client of the first user.

104: End operation or process in accordance with existing procedure.

For convenience of description and differentiation, the present embodiment uses the example of a first user asking to be added to a first user group. The first user could be any user and the first group could be any group. For example, the first group could be a group consisting of a certain enterprise, a group consisting of a certain department, a group consisting of a certain project group, a group consisting of persons of a certain type who share an interest, etc.

Optionally, the first user may take the initiative in requesting to be added to the first group. In this case, the first user could issue a group add request to an instant messaging-based information-processing means (abbreviated as information-processing means). Specifically, the first user could issue the group add request to the information-processing means via his or her own instant messaging client. The group add request carries the group identifier, e.g., group number or group name, for the first group that is the subject of the add request. The group add request also carries first user information, e.g., first user-registered account number or mobile phone number. This information-processing means could be an instant messaging server or another means independent of an instant messaging server but capable of communicating and exchanging information with an instant messaging server. The information-processing means could receive a group add request sent by the first user requesting to be added to the first group.

In addition, the administrator of the first group could add a new member directly to the first group, e.g., add an intern to a department's group. On this basis, the first group's administrator could send a group add request to the information-processing means requesting that the first user be added to the first group. The group add request carries the group identifier, e.g., group number or group name, for the first group that is the subject of the add request. The group add request also carries first user information, e.g., first user-registered account number or mobile phone number. The information-processing means could receive a group add request sent by the first group's administrator. This implementation permits the group administrator of the instant messaging software to add a new member directly to the group. This is particularly suitable for scenarios in which a new member is to be added in a business or office setting. In this case, the administrator could automatically add the new member to the instant messaging software group and automatically set the group permissions based on the employee's status. This would help instant messaging software to develop in the direction of a mobile office platform and would facilitate the opening of communications between instant messaging software and multiple OA systems within an enterprise, which could make possible unified management of leave requests, expense reports, salary, and other such business matters through instant messaging software.

Upon receiving a group add request requesting that the first user be added to the first group, the information-processing means can obtain the first user's information and the first group's information. It can then assess whether the first user needs to be added with a specific status to the first group.

Figure 3:
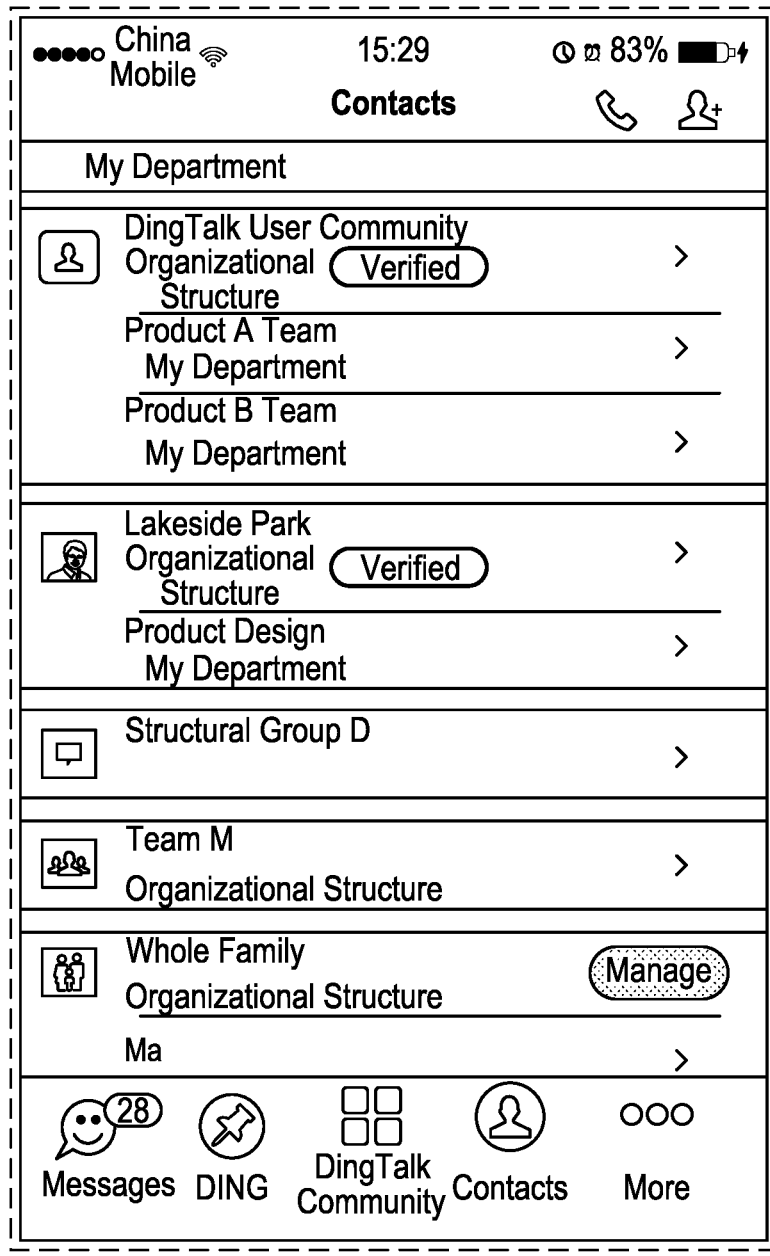
FIG. 3 is an illustration of an interface for groups in a DingTalk application scenario, as provided by an embodiment of the present application.

In an optional implementation, the first group's administrator can configure a specific status, such as visitor or guest status, for the first group and configure for this specific status group permissions, such as: May view the group's contact directory, cannot view the group's contact directory, can only view information other than the contact directory, can only view the name of the group, etc. In addition, the first group's administrator is responsible for registering accounts on behalf of first group members and for determining which members need to be added with a specific status and which members do not need to be added with a specific status. For example, someone who is serving as a temporary employee or contractor of the enterprise will need to be added with a specific status to the enterprise group. To give another example, the members of one group could be set up so as to be added to another group with a specific status. Thus, the first users would be members of the second group, the second group being a group different from the first group. To take an example in which the specific status is visitor or guest status, an interface for configuring visitor status between groups is as shown in FIG. 2. To take the example of groups in a DingTalk application scenario, as shown in FIG. 3, the settings for members of the two groups Product A Team and Product B Team may be such that they join the DingTalk user community group with visitor status. Thus, members in the two groups Product A Team and Product B Team may be understood as having a contractor role within the DingTalk user community.

Furthermore, the administrator could allocate a status weight to each member and allocate different status weights to users who need to be added with a specific status to the first group and to users who do not need to be added with a specific status to the first group so as to differentiate between them. In addition, the administrator could also assign a weight condition to correspond to a specific status. For example, there could be a weight range or weight threshold value. When a user's status weight meets the weight condition, e.g., is within the weight range or less than the weight threshold value, the user will be regarded as needing a specific status with which to be added to the first group. The administrator could upload the account number and status weight of each user in the first group to an instant messaging server.

Based on the above, the information-processing means may acquire a status weight for a first user. For example, it uses the first user's account number as a basis for acquiring the first user's status through an instant messaging server. Then it assesses whether the first user's status weight meets the weight condition corresponding to a specific status. For example, it assesses whether the first user's status weight is within a preset range of weights, or it assesses whether the first user's status weight is smaller than a preset threshold value. If the assessment result is yes, then it determines that the first user needs a specific status with which to be added to the first group. If the assessment result is no, then it determines the first user does not need a specific status with which to be added to the first group.

When the determination is made that the first user does not need a specific status with which to be added to the first group, the operation may end, or processing may proceed in accordance with a procedure of the prior art. The procedure of the prior art will not be discussed further here.

When the determination is made that the first user needs a specific status with which to be added to the first group, then the first user may be added with the specific status to the first group. In one respect, adding the first user according to a specific status to the first group mainly refers to: Subjecting the group information of said first group to screening in accordance with the group permissions corresponding to the specific status in order to obtain screened group information, and issuing the screened group information to the instant messaging client of the first user so that other users in the first group can conduct instant messaging with the first user while ensuring the security of group information.

Figure 4:
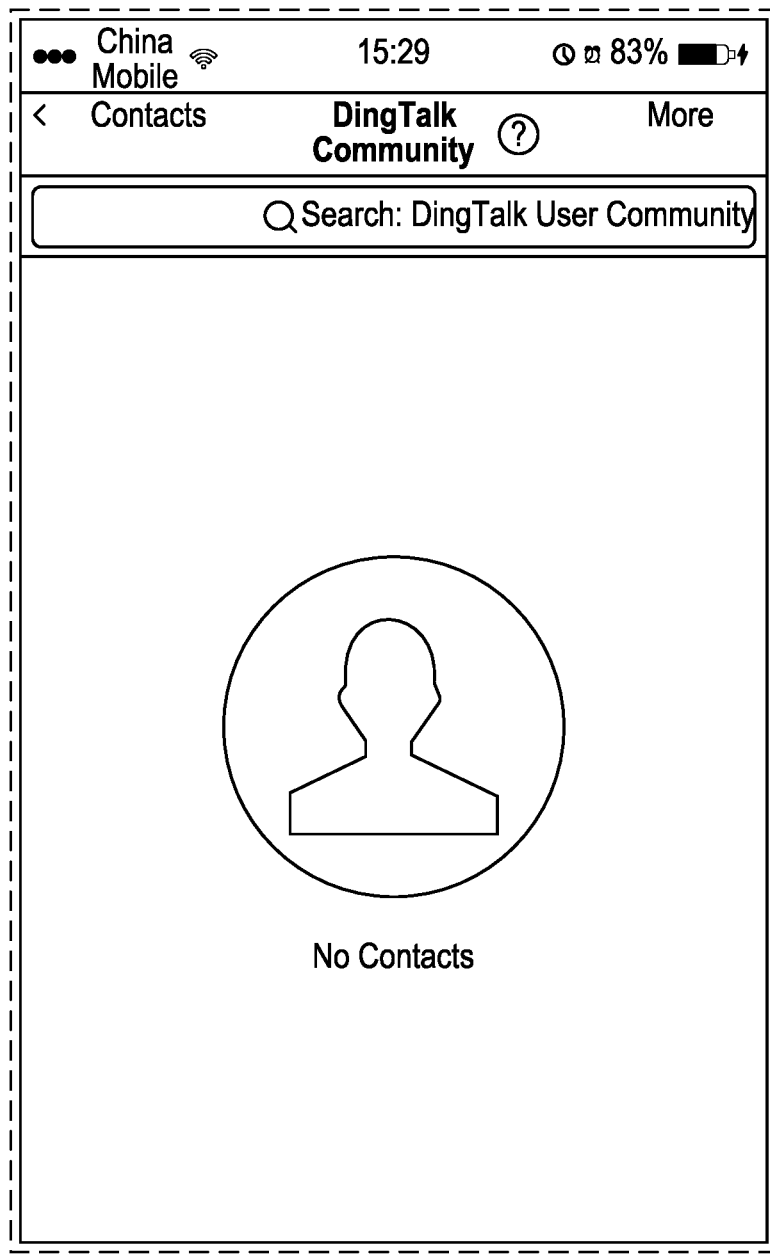
FIG. 4 is an illustration of an interface after a first user is added with visitor status to a first group, as provided by an embodiment of the present application.

For example, if the group weight corresponding to the specific status means that contact directory information cannot be viewed within the group, then the information-processing means can, in accordance with the group weight corresponding to the specific status, screen out the first group's contact directory information so as to obtain screened group information. The screened group information now does not include the first group's contact directory. Thus, the first user cannot see information (such as nicknames, profile pictures, true names, telephone numbers, email addresses, and other associated groups, or enterprises or departments) about other first group users on his or her instant messaging client until another user who was added without a specific status to the group initiates contact with the first user. In light of FIG. 3 described above, let us regard the members in the two groups of Product A Team and Product B Team as first users and the DingTalk user community group as the first group. In this case, the interface after the members in the two groups of Product A Team and Product B Team are added with visitor or guest status to the DingTalk user community group is as shown in FIG. 4. On the interface shown in FIG. 4, the members in the two groups of Product A Team and Product B Team cannot see information on any member in the DingTalk user community. In the present embodiment, other users mainly refer to users added without a specific status to the first group.

In addition, to enable other users that were added without specific status to the first group to promptly initiate communication with a first user, the first group's group information can be updated according to the first user's information (primarily refers to adding the first user's information to the first group's contact directory) in order to obtain updated group information, and the updated group information can be issued to the instant messaging clients of the other users who were added without specific status to the first group. In this way, the other users can view the first user's information (such as nickname, true name, profile picture, telephone number, email address, and other associated groups or enterprises or departments) on their own instant messaging clients.

Optionally, the information-processing means can issue updated group information to other users immediately after the first group's group information is updated according to the first user's information.

Optionally, whenever a user exits an instant messaging client and logs in again, the instant messaging client typically will again request group information from the server. On this basis, when a user exits an instant messaging client and logs in again, the information-processing means provides the user with updated group information. This is a relatively simple approach to implementation and has better compatibility than the prior art. It entails a smaller change to the instant messaging process. That is, the information-processing means can issue updated group information to the instant messaging client of another user upon receiving a login request sent from the instant messaging client of the other user.

Optionally, a user may take the initiative of requesting to update group information. For example, the user could send an information update request through his or her instant messaging client to request updating of group information. The information-processing means can issue updated group information to the instant messaging client of another user upon receiving an information update request sent from the instant messaging client of the other user.

Optionally, the information-processing means could set an information-updating period. When the end of the period is reached, updated group information is provided to the user. That is, the information-processing means can issue updated group information to the instant messaging clients of other users upon reaching the end of the preset information-updating period.

Furthermore, after the first user is added with a specific status to the first group, the other users can view the first user's information, but the first user cannot view the information of the other users. Thus, the other users of the first group can initiate communication with the first user. After one of the other users initiates communication with the first user, the first user might view or acquire the other user's information. To ensure the information security of the other user after the other user initiates communication with the first user, the first user may be subject to information security prevention and control based on the group permissions corresponding to the specific status.

After the other user launches communication with the first user, there is typically a leak of the other user's information in the contact directory. Furthermore, the other user may experience unnecessary annoyances during the communication process or after communication ends. For example, the first user acquires the other user's telephone number during the process of communicating with the other user and calls the other user during or after the communication process, thus annoying the other user.

On the basis of the above analysis, at least one of the following approaches may be employed to subject the first user to information security prevention and control based on the group permissions corresponding to the specific status after the other user launches communication with the first user, as was described above:

while the other user is communicating with the first user, the first user's form of communication is subjected to prohibitions, and/or the other user's information undergoes screening, in accordance with the group permissions corresponding to the specific status;

after communication between the other user and the first user ends, the first user's form of communication is subjected to prohibitions, and/or the other user's information undergoes screening, in accordance with the group permissions corresponding to the specific status.

It is worth noting that the ways in which the first user's form of communication is subjected to prohibitions and/or the other user's information undergoes screening vary according to the instant messaging app. The present application does not impose limits on instant messaging apps. For example, they could be QQ, WeChat, DingTalk, WangWang, etc.

Let us take DingTalk as an example. In addition to permitting users to communicate through an instant messaging window, DingTalk permits users to communicate without an instant messaging window, such as by telephone or Ding messages.

When the instant messaging window approach is employed, the user-to-user instant messaging window generally will display an entrance (such as, perhaps, a button or a function option) to non-instant messaging window forms of communication. In the present embodiment, in order to facilitate basic information exchanges between the other user and the first user, the other user is permitted to initiate communication with the first user by employing any instant messaging approach, and the first user is permitted to initiate communication with the other user with an instant messaging window after obtaining the other user's information. Therefore, the group permissions corresponding to the specific status may be set so as to permit a first user to initiate communication with another user employing the instant messaging window approach after obtaining the other user's information, but to prohibit the first user from launching communication with another user without using an instant messaging window.

In view of the above analysis, the implementations of the step that was described above (namely, while another user is communicating with a first user, the first user's form of communication is subjected to prohibitions, and/or the other user's information undergoes screening, in accordance with the group permissions corresponding to the specific status) include the two situations below:

The first situation: if the other user launches communication with the first user with an instant messaging window, then, while the other user and the first user are communicating, the instant messaging window provided by the first user's instant messaging client is screened from displaying an entrance to forms of communication other than the instant messaging window, and only the profile picture information of the other user is displayed in the instant messaging window provided by the first user's instant messaging client. Said approach whereby the entrance is screened out could consist of not displaying the button or function option indicating the entrance or of changing the button indicating the entrance to a non-available status.

Another situation: if the other user launches communication with the first user, then, while the other user and the first user are communicating, the first user is screened from initiating a function for a form of communication other than the instant messaging window, and other user information carried in the communication process is replaced by predetermined information.

Second situation: functions for initiating approaches other than that of the instant messaging window are screened out. This means that the first user can receive communication requests issued by other users for communication without the instant messaging window, but cannot initiate communication with another user without the instant messaging window due to lack of an initiating function. Said way in which the first user is screened from initiating a function other than the instant messaging window could consist of taking an instant messaging entrance, e.g., a button or a function menu, and canceling it or rendering it unavailable so as to attain the objective of prohibiting the first user from initiating communication without the instant messaging window. In addition, in this implementation, the other user's information carried in the communication process, e.g., the other user's telephone number carried in the communication process, is replaced by designated information, e.g., a 400 number. Or the other user's telephone number, name, or other such information carried in a text message is replaced by designated information, e.g., a 400 number. This can prevent the first user from learning the other user's information during the communication process and helps in preventing the first user from communicating in a way other than through his or her instant messaging client, e.g., by telephone or text messages, with the other user. It protects the other user from unnecessary annoyances.

Furthermore, if the other user launches communication with the first user with an instant messaging window, then, while the other user and the first user are communicating, the first user's instant messaging client will retain an instant messaging window between it and other users. In this way, the first user can initiate communication with other users via the instant messaging window. In addition, profile picture information of the other user to which the first user launched the communication will be displayed in the instant messaging window. This profile picture information refers to the personal details page of the other user. For example, by clicking the profile picture information, the user is doing the equivalent of issuing a request for the personal details page of the other user that would result in a jump to the personal details page of the other user. The personal details page generally includes relatively detailed information about the user, such as email address, associated department, employee rank, profile picture information, nickname, and true name. In addition, the personal details page normally will also display an entrance for a non-instant messaging window approach so that the user can directly launch communication with the user associated with the personal details page using an approach other than an instant messaging window. However, in the present embodiment, the first user needs to be prohibited from communicating with the other user without the instant messaging window.

In view of the analysis described above and in order to keep the other user's information confidential, the following will occur if the other user launches communication with the first user using the instant messaging window approach: when the first user issues a request through the other user's profile picture information in the instant messaging window to acquire the personal details page of the other user, the personal details page of the other user will be subjected to information screening, and the non-instant messaging window entrance displayed on the personal details page of the other user will be screened out. For example, information other than profile picture information could be screened out from the personal details page. The specific way in which it is screened out could consist of non-display or of covering over the relevant information with a covering strip. Said approach whereby the non-instant messaging window entrance displayed by the personal details page is screened out could consist of not displaying the button indicating the entrance or of changing the button indicating the entrance to a non-available status.

It is clear from the above that, when a first user is added with a specific status to a first group, the present embodiment screens the first group's group information with regard to the group permissions corresponding to the specific status. While meeting the need for instant messaging between other users and first users, it can achieve the goal of information security by screening out information that is inappropriate for viewing by those with the specific status. In addition, information security of the other users is further assured by the fact that, while another user is communicating with a first user or after communication has ended, the first user's form of communication is subjected to prohibitions and/or the other user's information undergoes screening. It protects the other users in the first group from unnecessary annoyances and solves the problems of the prior art.

Please note that all the method embodiments described above have been presented as a series of a combination of actions in order to simplify description. However, persons skilled in the art should know that the present application is not limited by the action sequences that are described, for some of the steps may make use of another sequence or be implemented simultaneously in accordance with the present application. Furthermore, persons skilled in the art should also know that the embodiments described in the specification are preferred embodiments and that the actions and modules involved therein are not necessarily required by the present application.

In the embodiments described above, the description of each embodiment has its respective emphasis, and parts of an embodiment are not described in detail. One may refer to other embodiments for the relevant descriptions.

Figure 5:
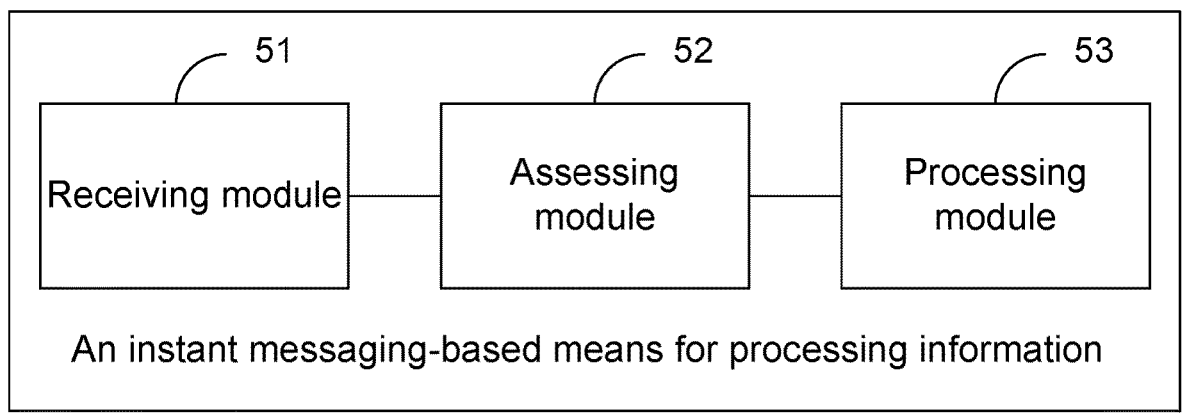
FIG. 5 is a structural diagram of an instant messaging-based information-processing means provided by another embodiment of the present application.

FIG. 5 is a structural diagram of an instant messaging-based information-processing means provided by an embodiment of the present application. As shown in FIG. 5, the means comprises: a receiving module 51, an assessing module 52, and a processing module 53.

The receiving module 51 is for receiving a group add request, said group add request being for requesting the addition of a first user to a first group.

The assessing module 52 is for assessing whether the first user needs to be added with a specific status to the first group.

The processing module 53 is for, when the assessment result of the assessing module 52 is yes, subjecting the group information of the first group to screening in accordance with the group permissions corresponding to the specific status in order to obtain screened group information and issuing the screened group information to the instant messaging client of the first user.

In an optional implementation, the receiving module 51 may be for:
receiving a group add request sent by a first user; or
receiving a group add request sent by the first group's administrator.

In an optional implementation, the assessing module 52 is specifically for:
acquiring the status weight of the first user;
assessing whether the status weight of the first user satisfies the weight condition corresponding to the specific status;
if the assessment result is yes, determining that the first user needs to be added with the specific status to the first group.

In an optional implementation, the processing module is specifically for screening out the first group's contact directory information in accordance with the group permissions corresponding to the specific status so as to obtain screened group information.

Figure 6:
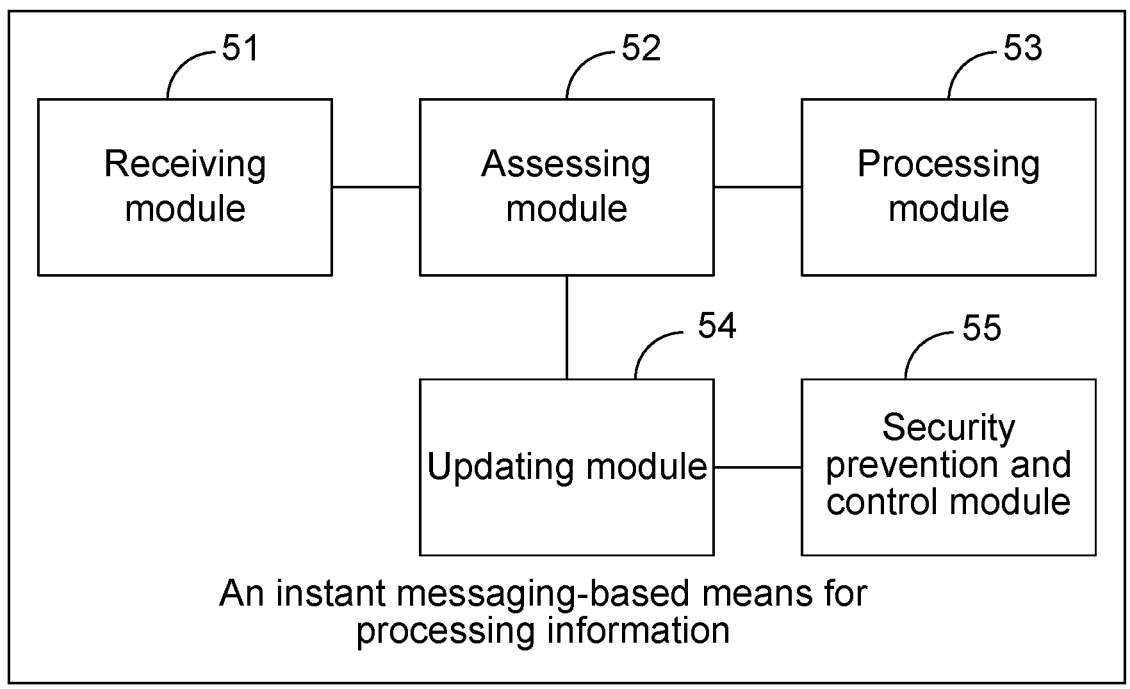
FIG. 6 is another structural diagram of an instant messaging-based information-processing means provided by an embodiment of the present application.

In an optional implementation, the means, as shown in FIG. 6, further comprises: an updating module 54.

The updating module 54 is for updating the first group's group information according to the first user's information so as to obtain updated group information and for issuing the updated group information to the instant messaging clients of other users in the first group who were not added with a specific status.

Furthermore, the updating module may be specifically for:

issuing updated group information to the instant messaging client of the other user upon receiving a login request sent from the instant messaging client of the other user; or issuing updated group information to the instant messaging client of the other user upon receiving an information update request sent from the instant messaging client of the other user; or issuing updated group information to the instant messaging client of the other user upon reaching the end of the preset information updating period.

Furthermore, as shown in FIG. 6, the means further comprises: a security prevention and control module 55.

The security prevention and control module 55 is for subjecting the first user to information security prevention and control based on the group permissions corresponding to the specific status after the other user launches communication with the first user.

Furthermore, the security prevention and control module 55 is specifically for:

while the other user is communicating with the first user, the first user's form of communication is subjected to prohibitions, and/or the other user's information undergoes screening, in accordance with the group permissions corresponding to the specific status; or after communication between the other user and the first user ends, the first user's form of communication is subjected to prohibitions, and/or the other user's information undergoes screening, in accordance with the group permissions corresponding to the specific status.

Furthermore, in the following situation, i.e., while another user is communicating with a first user, the first user's form of communication is subjected to prohibitions, and/or the other user's information undergoes screening, in accordance with the group permissions corresponding to the specific status, the security prevention and control module 55 is specifically for:

if the other user launches communication with the first user with an instant messaging window, then, while the other user and the first user are communicating, the instant messaging window provided by the first user's instant messaging client is screened from displaying an entrance to forms of communication other than the instant messaging window, and only the profile picture information of the other user is displayed in the instant messaging window;

if the other user launches communication with the first user, then, while the other user and the first user are communicating, the first user is screened from initiating a function for a form of communication other than the instant messaging window, and other user information carried in the communication process is replaced by predetermined information.

Furthermore, in the following situation, i.e., after communication between the other user and the first user has ended, the first user's form of communication is subjected to prohibitions, and/or the other user's information undergoes screening, in accordance with the group permissions corresponding to the specific status, the security prevention and control module 55 is specifically for:

if the other user launches communication with the first user using an instant messaging window, then, after communication between the other user and the first user ends, a request issued by the first user through the other user's profile picture information in the instant messaging window to acquire the personal details page of the other user serves as a basis for information screening of the personal details page of the other user, and the non-instant messaging window entrance displayed on the personal details page of the other user will be screened out.

The instant messaging-based information-processing means provided by the present embodiment could be an instant messaging server or another means independent of an instant messaging server, but capable of communicating and exchanging information with an instant messaging server.

The instant messaging-based information-processing means provided by the present embodiment does the following: when a first user is added with a specific status to a first group, it screens the first group's group information with regard to the group permissions corresponding to the specific status. While meeting the need for instant messaging between other users and first users, it can achieve the goal of information security by screening out information that is inappropriate for viewing by those with the specific status.

Furthermore, instant messaging-based information-processing means provided by the present embodiment achieves the following: the fact that, while another user is communicating with a first user or after communication has ended, the first user's form of communication is subjected to prohibitions, and/or the other user's information undergoes screening enables further assurance of the information security of the other users. It protects the other users in the first group from unnecessary annoyances and solves the problems of the prior art.

Persons skilled in the art may clearly understand that, for the sake of descriptive convenience and streamlining, one may refer to the processes in the aforesaid method embodiments that correspond to specific work processes of the systems, means, and units described above. They will not be discussed further here.

Please understand that, in several embodiments provided by the present application, the disclosed systems, means, and methods may be implemented in other ways. For example, the means embodiments described above are merely illustrative. For example, the division into said units is merely a division by logical function. When actually implemented, there may be other forms of division. For example, multiple units or components may be combined or integrated into another system, or some features might be omitted or not executed. In addition, the interposed couplings or direct couplings or communication connections that are displayed or discussed may be indirect couplings or communication links that pass through some interfaces, devices, or units. They may be electrical or mechanical or may take another form.

Units described as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

In addition, each functional unit in each of the embodiments of the present application may be integrated into a processing unit, or each unit may have an independent physical existence. Or two or more units may be integrated into one unit. The aforesaid integrated units can take the form of hardware, or they can take the form of hardware combined with software function units.

The units described above in which the software function units are integrated can be stored in a computer-readable storage medium. The aforesaid software function units are stored in a storage medium. This includes some commands for causing computer equipment (which could be a personal computer, a server, or network equipment) or a processor to execute some of the steps in the methods described by the various embodiments of the present application. The storage medium described above encompasses: USB flash drive, mobile hard drive, read-only memory (ROM), random access memory (RAM), magnetic disk, or optical disk, or various other media that can store program code.

The final point that should be explained is the following: the above embodiments only serve to explain the technical schemes of the present application and not to limit it. Although the present application was explained in detail with reference to the above-described embodiments, persons skilled in the art should understand that they may modify the technical schemes recorded in the various embodiments described above or provide equivalent substitutions for some of their technical features. Yet these modifications or substitutions do not cause the corresponding technical schemes to substantively depart from the spirit and scope of the technical schemes of the various embodiments of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, at a server, a request to add a first user to a first group;
   determining that the first user is associated with a specific status in the first group,
      wherein the specific status comprises a visitor status, a guest status, or a member of a second group, wherein the second group is different from the first group; and
      wherein one or more group permissions associated with the specific status are to restrict communication associated with the first user associated with the specific status; and
   in response to a determination that the first user is associated with the specific status:
      including the first user in the first group;
      generating a set of screened group information associated with the first group based at least in part on the one or more group permissions associated with the specific status;
      sending the set of screened group information associated with the first group to a client device operated by the first user, wherein a first instant messaging client associated with the first user that is executing at the client device is configured to present the set of screened group information associated with the first group;
      determining that communication has been established between the first instant messaging client associated with the first user and a second instant messaging client associated with a second user;
      determining that the second user is not associated with the specific status in the first group and that the first user is associated with the specific status in the first group; and
      in response to the determination that the second user is not associated with the specific status in the first group and that the first user is associated with the specific status in the first group restricting, based at least in part on the one or more group permissions associated with the specific status, the first instant messaging client associated with the first user from contacting the second instant messaging client associated with the second user using a form of communication other than instant messaging including by:
         omitting to display a button indicating an entrance to the form of communication other than instant messaging at an instant messaging window of the first instant messaging client; and
         replacing information associated with the second user with designated information within the instant messaging window of the first instant messaging client.

2. The method of claim 1, further comprising storing an indication associated with the first group that the first user is associated with the specific status.

3. The method of claim 1, wherein determining that the first user is associated with the specific status in the first group comprises:
   determining a status weight associated with the first user;
   determining whether the status weight associated with the first user meets a status weight condition corresponding to the specific status; and
   in response to a determination that the status weight associated with the first user meets the status weight condition corresponding to the specific status, determining that the first user is associated with the specific status.

4. The method of claim 1, wherein generating the set of screened group information associated with the first group based at least in part on the one or more group permissions associated with the specific status comprises screening at least a portion of contact directory information associated with the first group based at least in part on the one or more group permissions associated with the specific status such that the set of screened group information associated with the first group does not include the at least portion of the contact directory information associated with the first group.

5. The method of claim 1, further comprising generating a set of updated group information associated with the first group based at least in part on information associated with the first user.

6. The method of claim 1, further comprising:
   generating a set of updated group information associated with the first group based at least in part on information associated with the first user;
   receiving a login request from the second instant messaging client associated with the second user that is included in the first group; and
   in response to the login request, sending the set of updated group information associated with the first group to the second instant messaging client associated with the second user.

7. The method of claim 1, further comprising:
   generating a set of updated group information associated with the first group based at least in part on information associated with the first user;
   receiving an information update request from the second instant messaging client associated with the second user that is included in the first group; and
   in response to the information update request, sending the set of updated group information associated with the first group to the second instant messaging client associated with the second user.

8. The method of claim 1, further comprising:
   generating a set of updated group information associated with the first group based at least in part on information associated with the first user;

receiving an indication of a determination that a preset information updating period has ended; and in response to the indication, sending the set of updated group information associated with the first group to the second instant messaging client associated with the second user.

9. The method of claim 1, wherein the request to add the first user to the first group is received from the first instant messaging client associated with the first user.

10. The method of claim 1, wherein the request to add the first user to the first group is received from an administrator associated with the first group.

11. A system, comprising:
one or more processors configured to:
receive a request to add a first user to a first group;
determine that the first user is associated with a specific status in the first group,
wherein the specific status comprises a visitor status, a guest status, or a member of a second group, wherein the second group is different from the first group; and
wherein one or more group permissions associated with the specific status are to restrict communication associated with the first user associated with the specific status; and
in response to a determination that the first user is associated with the specific status:
include the first user in the first group;
generate a set of screened group information associated with the first group based at least in part on the one or more group permissions associated with the specific status;
send the set of screened group information associated with the first group to a client device operated by the first user, wherein a first instant messaging client associated with the first user that is executing at the client device is configured to present the set of screened group information associated with the first group;
determine that communication has been established between the first instant messaging client associated with the first user and a second instant messaging client associated with a second user and that the first user is associated with the specific status in the first group;
determine that the second user is not associated with the specific status in the first group; and
in response to the determination that the second user is not associated with the specific status in the first group and that the first user is associated with the specific status in the first group restrict, based at least in part on the one or more group permissions associated with the specific status, the first instant messaging client associated with the first user from contacting the second instant messaging client associated with the second user using a form of communication other than instant messaging including by:
omitting to display a button indicating an entrance to the form of communication other than instant messaging at an instant messaging window of the first instant messaging client; and
replacing information associated with the second user with designated information within the instant messaging window of the first instant messaging client; and one or more memories coupled to the one or more processors and configured to provide the one or more processors with instructions.

12. The system of claim 11, wherein the one or more processors are further configured to:
generate a set of updated group information associated with the first group based at least in part on information associated with the first user;
receive a login request from the second instant messaging client associated with the second user that is included in the first group; and
in response to the login request, send the set of updated group information associated with the first group to the second instant messaging client associated with the second user.

13. The system of claim 11, wherein the one or more processors are further configured to:
generate a set of updated group information associated with the first group based at least in part on information associated with the first user;
receive an information update request from the second instant messaging client associated with the second user that is included in the first group; and
in response to the information update request, send the set of updated group information associated with the first group to the second instant messaging client associated with the second user.

14. A computer program product, the computer program product being embodied in a non-transitory computer readable storage medium and comprising computer instructions for:
receiving a request to add a first user to a first group;
determining that the first user is associated with a specific status in the first group,
wherein the specific status comprises a visitor status, a guest status, or a member of a second group, wherein the second group is different from the first group; and
wherein one or more group permissions associated with the specific status are to restrict communication associated with the first user associated with the specific status; and
in response to a determination that the first user is associated with the specific status:
including the first user in the first group;
generating a set of screened group information associated with the first group based at least in part on the one or more group permissions associated with the specific status;
sending the set of screened group information associated with the first group to a client device operated by the first user, wherein a first instant messaging client associated with the first user that is executing at the client device is configured to present the set of screened group information associated with the first group;
determining that communication has been established between the first instant messaging client associated with the first user and a second instant messaging client associated with a second user;
determining that the second user is not associated with the specific status in the first group and that the first user is associated with the specific status in the first group; and
in response to the determination that the second user is not associated with the specific status in the first group and that the first user is associated with the specific status in the first group restricting, based at least in part on the one or more group permissions associated with the specific status, the first instant messaging client associated with the first user from contacting the second instant messaging client associated with the second user using a form of communication other than instant messaging including by:
  omitting to display a button indicating an entrance to the form of communication other than instant messaging at an instant messaging window of the first instant messaging client; and
  replacing information associated with the second user with designated information within the instant messaging window of the first instant messaging client.

15. The system of claim 11, wherein to determine that the first user is associated with the specific status in the first group comprises to:
  determine a status weight associated with the first user;
  determine whether the status weight associated with the first user meets a status weight condition corresponding to the specific status; and
  in response to a determination that the status weight associated with the first user meets the status weight condition corresponding to the specific status, determine that the first user is associated with the specific status.

16. The system of claim 11, wherein to generate the set of screened group information associated with the first group based at least in part on the one or more group permissions associated with the specific status comprises to screen at least a portion of contact directory information associated with the first group based at least in part on the one or more group permissions associated with the specific status such that the set of screened group information associated with the first group does not include the at least portion of the contact directory information associated with the first group.

17. The system of claim 11, wherein the one or more processors are further configured to generate a set of updated group information associated with the first group based at least in part on information associated with the first user.

18. The system of claim 11, wherein the one or more processors are further configured to:
  generate a set of updated group information associated with the first group based at least in part on information associated with the first user;
  receive a login request from the second instant messaging client associated with the second user that is included in the first group; and
  in response to the login request, send the set of updated group information associated with the first group to the second instant messaging client associated with the second user.

19. The system of claim 11, wherein the one or more processors are further configured to:
  generate a set of updated group information associated with the first group based at least in part on information associated with the first user;
  receive an information update request from the second instant messaging client associated with the second user that is included in the first group; and
  in response to the information update request, send the set of updated group information associated with the first group to the second instant messaging client associated with the second user.

20. The system of claim 11, wherein the one or more processors are further configured to:
  generate a set of updated group information associated with the first group based at least in part on information associated with the first user;
  receive an indication of a determination that a preset information updating period has ended; and
  in response to the indication, send the set of updated group information associated with the first group to the second instant messaging client associated with the second user.

* * * * *

UNITED STATES PATENT AND TRADEMARK OFFICE
CERTIFICATE OF CORRECTION

PATENT NO. : 10,958,602 B2
APPLICATION NO. : 15/769055
DATED : March 23, 2021
INVENTOR(S) : Xinglin Ma, Yida Zhao and Wang Liao It is certified that error appears in the above-identified patent and that said Letters Patent is hereby corrected as shown below:

On the Title Page

Column 1, item (73), Assignee, after "Alibaba Group Holding Limited", insert --Cayman Islands--.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*